United States Patent
Gaugey

(10) Patent No.: US 12,546,021 B2
(45) Date of Patent: Feb. 10, 2026

(54) PINION SHAFT, WATCH MECHANISM, WATCH OR MEASUREMENT DEVICE WITHOUT A MAGNETIC SIGNATURE

(71) Applicant: Omega SA, Biel/Bienne (CH)

(72) Inventor: Guillaume Gaugey, Doubs (FR)

(73) Assignee: Omega SA, Biel/Bienne (CH)

( * ) Notice: Subject to any disclaimer, the term of this patent is extended or adjusted under 35 U.S.C. 154(b) by 149 days.

(21) Appl. No.: 17/975,706

(22) Filed: Oct. 28, 2022

(65) Prior Publication Data

US 2023/0054725 A1 Feb. 23, 2023

Related U.S. Application Data

(63) Continuation of application No. 16/075,889, filed as application No. PCT/IB2017/050954 on Feb. 20, 2017.

(30) Foreign Application Priority Data

Feb. 19, 2016 (EP) ...................................... 16156588

(51) Int. Cl.
*G04B 15/14* (2006.01)
*B32B 15/01* (2006.01)
(Continued)

(52) U.S. Cl.
CPC .............. *C25D 7/005* (2013.01); *B32B 15/01* (2013.01); *C22C 9/00* (2013.01); *C22C 9/04* (2013.01); *C22C 9/06* (2013.01); *C22C 14/00* (2013.01); *C22C 19/03* (2013.01); *C22C 19/07* (2013.01); *C22C 30/00* (2013.01); *C22C 38/00* (2013.01); *C22C 38/001* (2013.01); *C22C 38/02* (2013.01); *C22C 38/04* (2013.01); *C22C 38/18* (2013.01); *C22C 38/20* (2013.01); *C22C 38/22* (2013.01); *C22C 38/38* (2013.01); *C22C 38/42* (2013.01); *C22C 38/44* (2013.01); *C23C 18/34* (2013.01); *C25D 7/00* (2013.01); *G04B 13/00* (2013.01);
(Continued)

(58) Field of Classification Search
CPC ....... G04B 13/026; G04B 17/32; G04B 37/22
See application file for complete search history.

(56) References Cited

U.S. PATENT DOCUMENTS 3,620,005 A 11/1971 Ganter et al.
3,683,616 A 8/1972 Steinemann
(Continued)

FOREIGN PATENT DOCUMENTS

CH 681 370 A5 3/1993
CH 707 503 A2 7/2014
(Continued)

OTHER PUBLICATIONS

Examination report mailed Jun. 23, 2022 in corresponding Indian Patent Application No. 202248001475 (6 pages).
(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A mechanical watch or measurement instrument having metallic parts, wherein each part of the mechanical watch mechanism has a relative magnetic permeability of less than 1.01.

18 Claims, 4 Drawing Sheets

(51) Int. Cl.

| | |
|---|---|
| *C22C 9/00* | (2006.01) |
| *C22C 9/04* | (2006.01) |
| *C22C 9/06* | (2006.01) |
| *C22C 14/00* | (2006.01) |
| *C22C 19/03* | (2006.01) |
| *C22C 19/07* | (2006.01) |
| *C22C 30/00* | (2006.01) |
| *C22C 38/00* | (2006.01) |
| *C22C 38/02* | (2006.01) |
| *C22C 38/04* | (2006.01) |
| *C22C 38/18* | (2006.01) |
| *C22C 38/20* | (2006.01) |
| *C22C 38/22* | (2006.01) |
| *C22C 38/38* | (2006.01) |
| *C22C 38/42* | (2006.01) |
| *C22C 38/44* | (2006.01) |
| *C23C 18/34* | (2006.01) |
| *C25D 7/00* | (2006.01) |
| *G04B 13/00* | (2006.01) |
| *G04B 13/02* | (2006.01) |
| *G04B 17/28* | (2006.01) |
| *G04B 17/32* | (2006.01) |
| *G04B 29/02* | (2006.01) |
| *G04B 37/22* | (2006.01) |
| *G04B 43/00* | (2006.01) |
| *G04B 31/008* | (2006.01) |

(52) U.S. Cl.
CPC ............ *G04B 13/02* (2013.01); *G04B 15/14* (2013.01); *G04B 17/285* (2013.01); *G04B 17/32* (2013.01); *G04B 29/027* (2013.01); *G04B 37/22* (2013.01); *G04B 43/007* (2013.01); *G04B 31/008* (2013.01)

(56) References Cited

U.S. PATENT DOCUMENTS

| | | | |
|---|---|---|---|
| 3,694,885 A | 10/1972 | Simon-Vermot | |
| 5,805,535 A | 9/1998 | Guyard | |
| 6,329,077 B1 * | 12/2001 | Kugler | C23C 30/00 428/564 |
| 7,077,562 B2 | 7/2006 | Bourgeois et al. | |
| 9,377,760 B2 | 6/2016 | Von Gruenigen | |
| 9,658,597 B2 | 5/2017 | Dubois et al. | |
| 2004/0062151 A1 | 4/2004 | Miyama | |
| 2004/0093730 A1 | 5/2004 | Miya | |
| 2005/0281137 A1 | 12/2005 | Bourgeois et al. | |
| 2009/0154303 A1 | 6/2009 | Vaucher et al. | |
| 2010/0091617 A1 | 4/2010 | Goeller et al. | |
| 2010/0290320 A1 | 11/2010 | Gygax et al. | |
| 2010/0315908 A1 | 12/2010 | Tran et al. | |
| 2011/0286312 A1 | 11/2011 | Murakami et al. | |
| 2012/0082009 A1 | 4/2012 | Mariotto | |
| 2012/0155229 A1 | 6/2012 | Araki | |
| 2014/0198625 A1 | 7/2014 | Von Gruenigen | |
| 2015/0286188 A1 | 10/2015 | Dubois | |
| 2015/0286189 A1 | 10/2015 | Gruenig | |
| 2015/0331391 A1 | 11/2015 | Dubois et al. | |
| 2015/0355598 A1 | 12/2015 | Fussinger et al. | |
| 2018/0024499 A1 | 1/2018 | Charbon | |
| 2018/0024500 A1 | 1/2018 | Charbon | |
| 2018/0024501 A1 | 1/2018 | Fussinger | |
| 2018/0173165 A1 | 6/2018 | Fussinger | |

FOREIGN PATENT DOCUMENTS

| | | |
|---|---|---|
| CH | 709 665 A2 | 11/2015 |
| CN | 2253241 Y | 4/1997 |
| CN | 105074585 A | 11/2015 |
| DE | 1 932 257 A1 | 3/1970 |
| EP | 1422436 A1 | 5/2004 |
| JP | 52-117244 A | 10/1977 |
| JP | 54-85127 A | 7/1979 |
| JP | 57-82786 A | 5/1982 |
| JP | 63-223151 A | 9/1988 |
| JP | 63-252284 A | 10/1988 |
| JP | 9-217611 A | 8/1997 |
| JP | 10-183277 A | 7/1998 |
| JP | 11-44782 A | 2/1999 |
| JP | 2002-365377 A | 12/2002 |
| JP | 2003-239083 A | 8/2003 |
| JP | 2003-253473 A | 9/2003 |
| JP | 2006-507454 A | 3/2006 |
| JP | 2009-528524 A | 8/2009 |
| JP | 2010-85413 A | 4/2010 |
| JP | 2010-138491 A | 6/2010 |
| JP | 2011-2451 A | 1/2011 |
| JP | 2011-505003 A | 2/2011 |
| JP | 2011-164097 A | 8/2011 |
| JP | 2012-78354 A | 4/2012 |
| JP | 2012-141156 A | 7/2012 |
| JP | 2014-137376 A | 7/2014 |
| JP | 2015-230309 A | 12/2015 |
| WO | WO 2014/154510 A2 | 10/2014 |

OTHER PUBLICATIONS

Machine Translation of CH681370 (Year: 2021).
Indian Office Action issued Apr. 12, 2021 in Indian Patent Application No. 201847035143, 7 pages.
Jozef A. Helsen, et al. "Biomaterials, a Tantalus Experience (Biological and Medical Physics, Biomedical Engineering)" Springier, 2010, pp. 1-5 and 209-210.
"Chinese Beryllium Industry" Edited by Jingming, Zhong, Beijing: Metallurgical Industry Press, Apr. 30, 2015, pp. 149-150 (with English Translation).
Chinese Office Action issued Sep. 7, 2020 in Chinese Patent Application No. 201780012153.X (with English translation), 15 pages.
Office Action issued Apr. 13, 2021 in corresponding Japanese Patent Application No. 2020-087874 (with English Translation), 15 pages.
International Search Report issued June 9. 2017 in PCT/IB2017/050954 filed Feb. 20, 2017.
M. Wolf et al., "IWC Ocean 2000 Bund, Zeitzeuge: Geheimnistrager JUrgen King," IWC Watch International, No. 3/0225, Sep. 4, 2006, XP055294291, 2 pages.
A. van der Meijden et al., "The IWC Ocean Bund Diver's Watch 1," Horological Journal, Jan. 1, 2009, XP055295100, retrieved from the internet: http://milspectime.com/wp-content/uploads/2013/04/IWC-Bund-Watches_HJ_Adrian1.pdf, 8 pages.
Lamineries Matthey SA: "Phynox," Jan. 1, 2013, XP055373106, retrieved from the Internet: http://www.matthey.ch/fileadmin/user_upload/downloads/fichetechnique/EN/Phynox_C.pdf, 3 pages.
Beryllium Science & Technology Association, BeST: "Wrought Copper Beryllium Alloy Compositions," Jan. 31, 2016, XP055307617, retrieved from the Internet: https://web.archive.org/web/20160131060251/http://beryllium.eu/about-beryllium-and-beryllium-alloys/properties-of-beryllium/properties-of-beryllium-alloys/wrought-copper-beryllium-alloy-compositions/, 2 pages.
"The Engineering Properties of Electroless Nickel Coatings," May 19, 1983, XP055079922. retrieved from the Internet: www.techmetals.com/InternetArticles/Engineering-Properties-of-EN-Coatings.pdf, 23 pages.
Www.techmetals.com/InternetArticles/Engineering-Properties-of-EN- Coatings.pdf, 23 pages.
Notice of the Reason for Refusal issued Nov. 29, 2022 in Japanese Patent Application No. 2021-168340 (with English language translation), 8 pages.
Japanese Office Action issued on Mar. 7, 2023 in Japanese Patent Application No. 2021-168340 (with English translation), 9 pages.
Standard Specification for Wrought 18Chromium-14Nickel-2. 5Molybdenum Stainless Steel Bar and Wire for Surgical Implants (UNS S31673)[1]. Designation: F138-13a, ASTM International, Nov. 30, 2013.

(56) References Cited

OTHER PUBLICATIONS

Standard Specification for Wrought, Nitrogen Strengthened 23Manganese-21Chromium-1Molybdenum Low-Nickel Stainless Steel Alloy Bar and Wire for Surgical Implants (UNS S29108)[1], Designation: F2229-07, ASTM International, Aug. 31, 2007.
Fourth Office Action dated Aug. 8, 2023, issued in corresponding Chinese patent application No. 201780012153.X (with English translation).
Notice of Reasons for Refusal dated Aug. 21, 2024 issued in Japanese patent application No. 2023-204552 (with English translation).

* cited by examiner

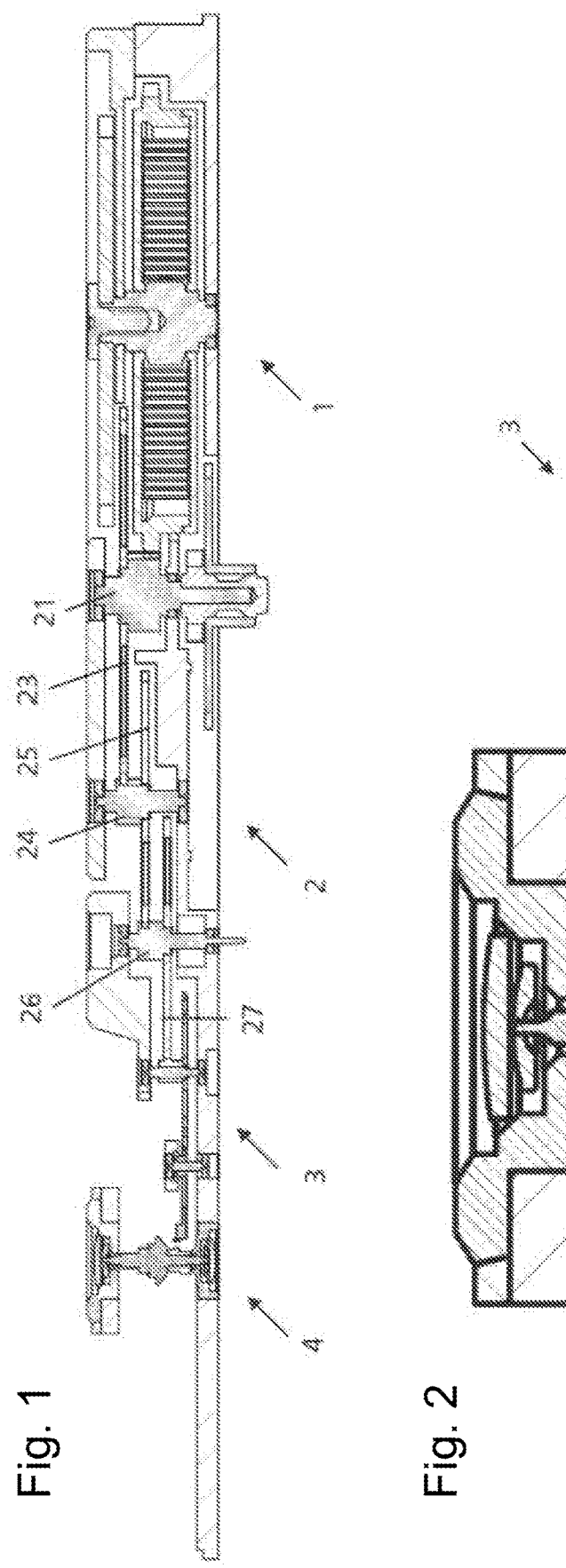
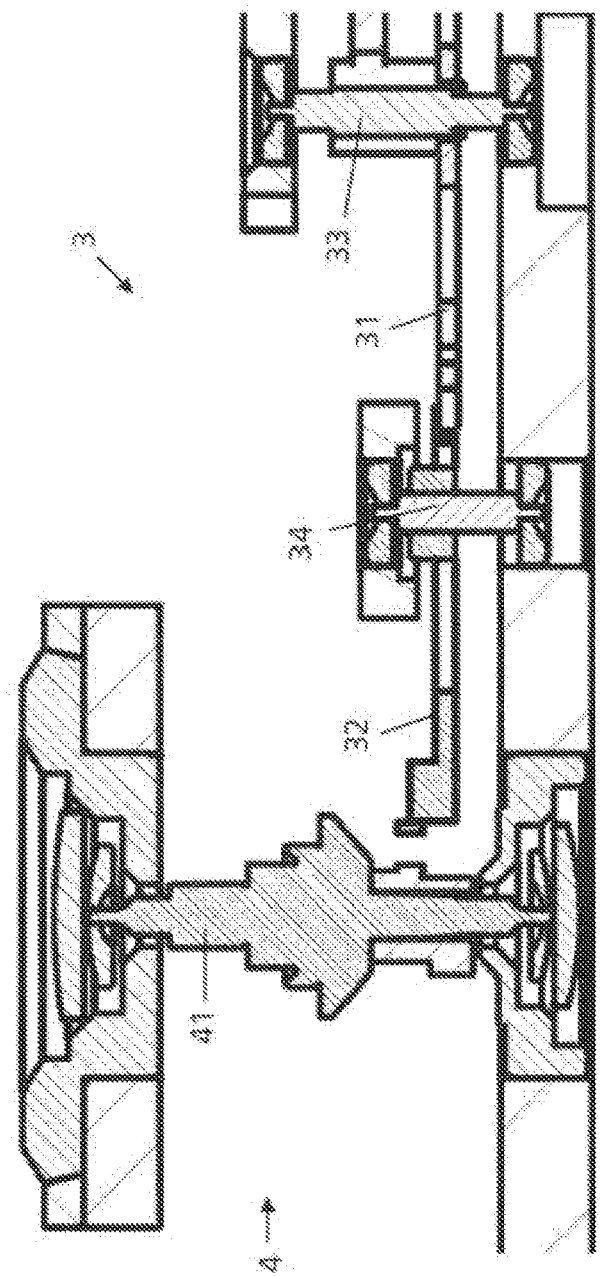
Fig. 1
Fig. 2

PINION SHAFT, WATCH MECHANISM, WATCH OR MEASUREMENT DEVICE WITHOUT A MAGNETIC SIGNATURE

CROSS REFERENCE TO RELATED APPLICATIONS

This is a continuation application of U.S. application Ser. No. 16/075,889, filed Aug. 6, 2018, which is a National Stage of International Application No. PCT/IB2017/050954, filed Feb. 20, 2017, and is based upon and claims the benefit of priority from European Patent Application No. 16156588.2, filed Feb. 19, 2016. The entire contents of each of which are incorporated herein by reference.

TECHNICAL FIELD

The invention relates to a watch mechanism, to a watch and to a measurement device without a magnetic signature, and to a method and a shaft for producing the same.

PRIOR ART

There are certain situations in which any magnetism is undesired or even hazardous. For example, in the field of explosive ordnance clearance, even weak magnetic fields are sufficient to trigger an induction detonator of a bomb or mine. Therefore, the NATO standard STANAG 2897 for the inspection of amagnetic tools for use in the field of explosive ordnance clearance demands a total magnetic signature of at most 5 nT (nanotesla).

Electrical or mechanical watches with metal parts from the prior art always have a magnetic signature. The electrical currents of digital or quartz watches generate magnetic fields which are relatively high for these situations, and thus generate a strong magnetic signature. However, even purely mechanical watches always, owing to the metals used, exhibit remanence, which alone generates too strong a magnetic signature. Such remanence originates from magnetic fields encountered in everyday life which magnetize metallic parts, such that the metallic parts subsequently exhibit remanence even in the absence of magnetic fields. For this reason, no watches can be worn in magnetic-field-sensitive situations.

The influence of a watch on the surroundings is however a little-known problem in the watch industry, because this focuses only on the problem of reducing the influence of magnetic fields on the motion of a mechanical watch. To date, there is no known wristwatch that has satisfied the STANAG 2897 standard.

To solve the problem of reducing the influence of magnetic fields on the motion of a mechanical watch, it is known from DE1932257 to use amagnetic materials with a magnetic relative permeability of less than 1.01 for some of the moving parts of a watch mechanism. However, not all parts of the watch mechanism are amagnetic, such that the disclosed solution, despite offering good functionality of the watch in a magnetic field, cannot prevent the remaining moving and/or non-moving parts of the watch with a permeability of greater than 1.01 exhibiting remanence after departing from the magnetic field. In particular, no solution is disclosed for amagnetic materials to be used for drive shafts.

U.S. Pat. No. 36,200,005 discloses an amagnetic drive shaft which is produced from injection-molded plastic, bronze or copper beryllium. The proposed amagnetic materials are too soft to realize adequate quality of accuracy.

As well as not addressing the problem of an amagnetic watch, a watchmaker would consider the realization of a metallic watch mechanism exclusively from amagnetic materials to be impracticable, because the amagnetic metals known in the watch industry cannot satisfy the numerous demands such as processability, wear, hardness, interaction with other parts, etc., in a watch mechanism. This relates in particular to the metals used for the drive shafts, but also to the multiplicity of small parts, such as for example milled springs, etc. For example, the copper beryllium proposed in U.S. Pat. No. 36,200,005 for the drive shafts is too soft to satisfy many standards of the Federation of the Swiss Watch Industry (NIHS). For example, an impact prescribed by the NIHS 91-10 standard (in the version amended in 2016) would bend the teeth of the pinion of the drive shaft. Also, the forces that act in the mechanism of the watch mechanism are too great for a drive shaft composed of copper beryllium, such that the pins and the engagement region of the teeth of the pinion would become worn within a short time and the accuracy demanded by NIHS standards would no longer be satisfied. Accordingly, owing to these wear phenomena, such a watch would very quickly no longer satisfy the NIHS 90-10 standard (in the version amended in 2003) for amagnetic watches, which demands an accuracy of 30 seconds per day regardless of whether or not the watch is exposed to a magnetic field. Therefore, to date, there is no known wristwatch that satisfies the STANAG 2897 standard and at the same time satisfies the NIHS 91-10 standard for shock resistance and/or exhibits the accuracy demanded in some standards, such as for example NIHS 90-10 for amagnetic watches, after a running time of 6 months.

Similar problems arise in the case of other measurement instruments, such as for example depth meters, pressure meters, speed meters or altitude meters.

Presentation of the Invention

It is therefore an objective to find a watch mechanism, a watch, a measurement instrument and a shaft, the influence of which on the environment is minimal.

This objective is achieved by means of a watch or a measurement instrument whose individual parts all have a relative magnetic permeability of less than 1.01.

This objective is achieved by means of a watch mechanism whose individual parts all have a relative magnetic permeability of less than 1.01.

This objective is achieved by means of a shaft, in particular a pinion shaft, for a watch mechanism or for a measurement instrument, which has a relative magnetic permeability of less than 1.01.

Through the exclusive use of individual parts which have a relative magnetic permeability of less than 1.01, no part of the watch mechanism or of the watch or of the measurement instrument is magnetizable in a magnetic field. Thus, a watch mechanism of said type exhibits no remanence even after exposure to strong magnetic fields. In this way, the influence of the watch mechanism on the environment is reduced.

Further advantageous embodiments are specified in the dependent claims.

In one exemplary embodiment, the mechanical watch mechanism, the watch or the measurement instrument has at least one part which is produced from beryllium copper and which is hardened with a coating, preferably with a nickel layer, which increases the hardness of the beryllium copper. The at least one part produced from this metal is preferably a shaft for the rotatable mounting of a further part. This metal alloy is amagnetic and is soft enough for the cutting or milling of the shapes, which for watch mechanisms are complex, of the shaft in a watch, such as for example a pinion shaft. By means of the preferably subsequent hardening of the material with an amagnetic coating, firstly the magnetic characteristics of the shaft are not impaired and secondly the required hardness is achieved in order to satisfy the requirements for wear, friction and accuracy of the watch mechanism. This material, which is unknown in the watchmaking industry, in particular for pinion shafts, is distinguished by its amagnetism, its good processability and its hardness. Shafts and other parts composed of this metal alloy may also be used in watch mechanisms or measurement instruments other than the watch mechanisms or measurement instruments described above.

In one exemplary embodiment, at least one part of the watch mechanism, of the watch or of the measurement instrument is produced from an alloy which, as main constituents, has cobalt, chromium, iron and nickel. This material, which is not used in the watchmaking industry owing to the poor processability, is distinguished by its amagnetism and its good material characteristics for the abovementioned parts. The at least one part composed of this alloy is preferably one or more of a spring, an escapement wheel, an escapement piece, a stud holder, a bridge, in particular a tourbillon cage bridge, and/or a tourbillon (or parts thereof) of the watch mechanism. In particular, the tourbillon cage of a tourbillon is advantageously produced from this alloy. Springs, escapement wheels, escapement pieces, bridges, studs and/or tourbillons for watch mechanisms, or other parts composed of this alloy, may also be used in watch mechanisms or measurement instruments other than the watch mechanisms or measurement instruments described above.

In one exemplary embodiment, at least one part of the watch mechanism, of the watch or of the measurement instrument is produced from an amagnetic high-grade steel. The amagnetic high-grade steel preferably has more than 10%, preferably more than 15%, chromium. The at least one part is for example the winding shaft of the watch mechanism. This material has the advantage of being rust-resistant and of withstanding high forces. Owing to the poor processability, amagnetic high-grade steels are normally not used in the watchmaking industry.

In one exemplary embodiment, the watch mechanism or the measurement instrument has a housing composed of titanium.

In one exemplary embodiment, the watch mechanism has at least one tooth gear and/or a spring housing which is produced from a copper alloy, in particular from a copper alloy having 7.5 percent nickel and 5 percent tin.

In one exemplary embodiment, the watch mechanism has a circuit board and at least one bridge which are produced from brass.

DESCRIPTION OF THE FIGURES

The invention will be described in more detail with the aid of the following figures:

FIG. 1 shows a section through an exemplary embodiment of a watch mechanism;

FIG. 2 shows a first enlarged detail of FIG. 1;

WAYS OF IMPLEMENTING THE INVENTION

Below, a description will be given as regards how it has been possible to produce a watch, a watch mechanism and a shaft for a watch mechanism which, or the individual parts of which, has or have a relative magnetic permeability of less than 1.01. Here, the realization is such that all individual parts have a relative magnetic permeability of less than 1.0100. The relative magnetic permeability is preferably between 0.99 and 1.01 or 1.0100. The watch is preferably a wristwatch or pocket watch, wherein this watch mechanism may however also be installed in other watches. Where reference is made below to an amagnetic material or part, this means a material or part with a relative magnetic permeability of less than 1.01, preferably less than 1.0100.

Figure 3:
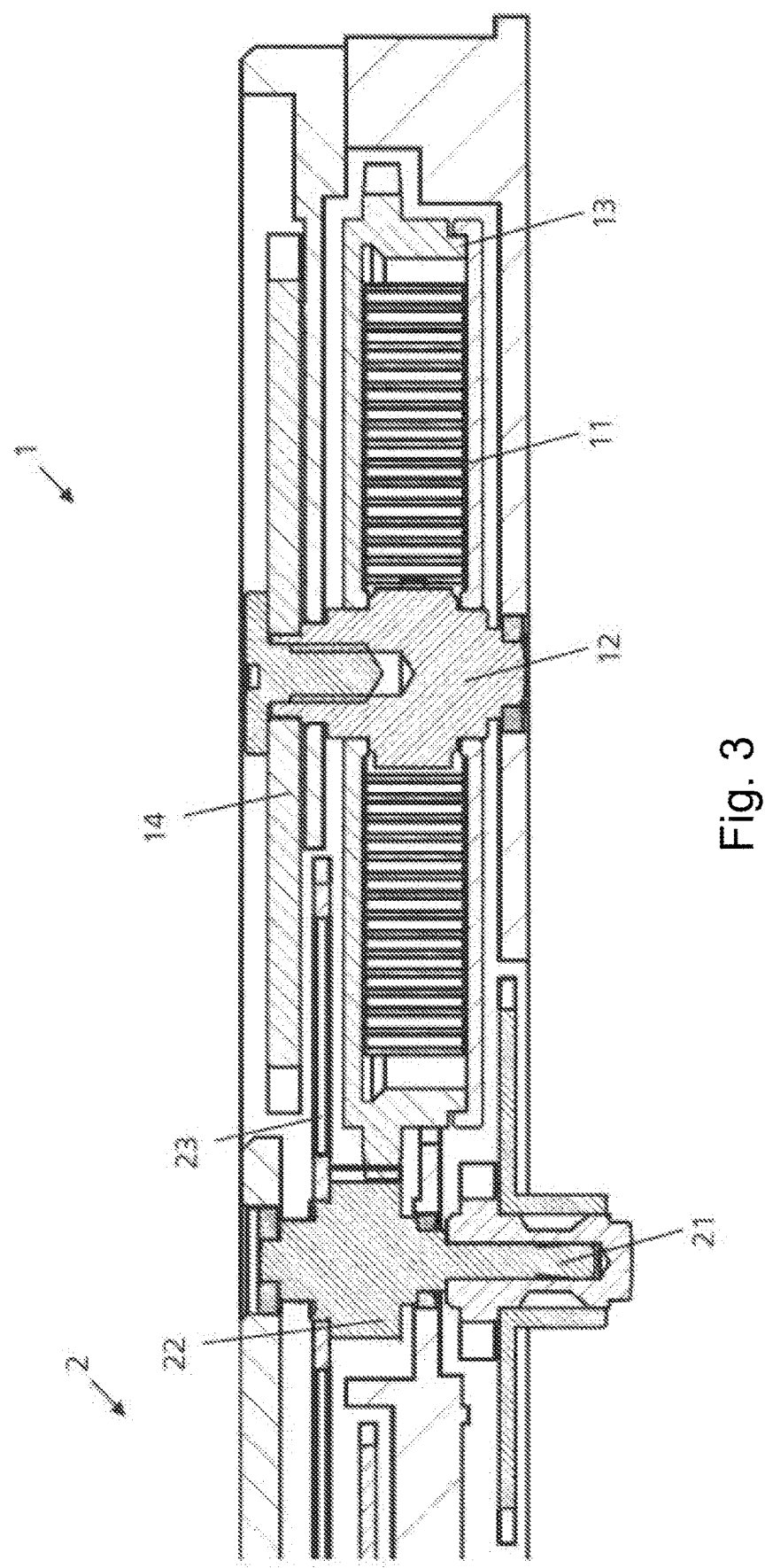
FIG. 3 shows a second enlarged detail of FIG. 1.
Figure 4:
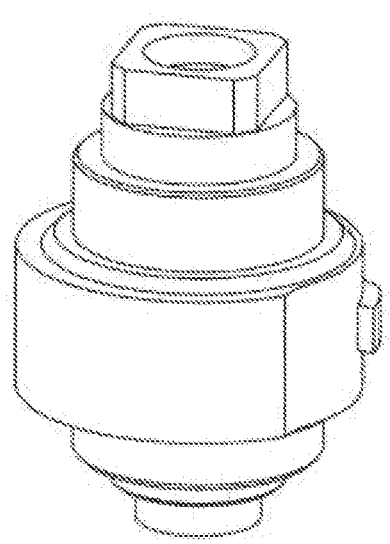
FIG. 4 shows a three-dimensional view of an exemplary embodiment of the drive shaft.
Figure 5:
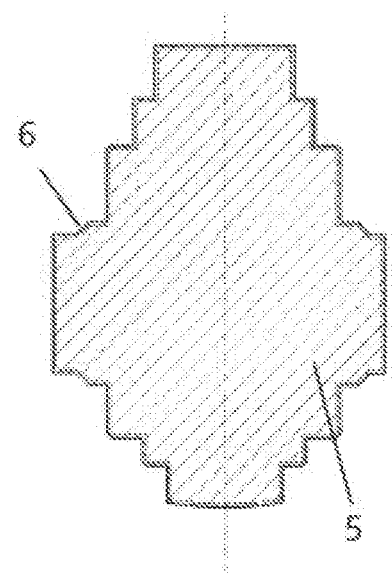
FIG. 5 shows a section through an exemplary embodiment of the drive shaft.
Figure 6:
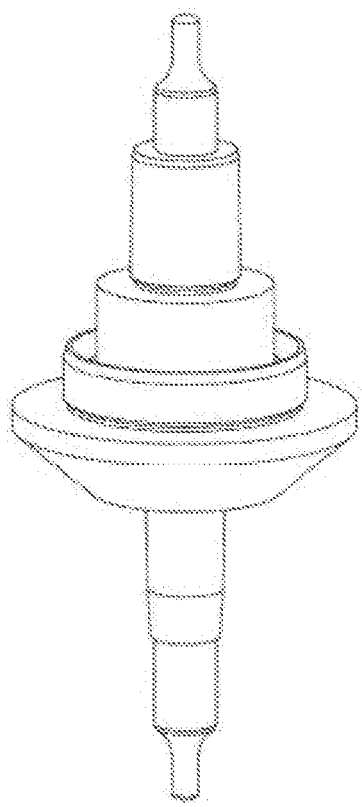
FIG. 6 shows a three-dimensional view of an exemplary embodiment of the balance wheel shaft.
Figure 7:
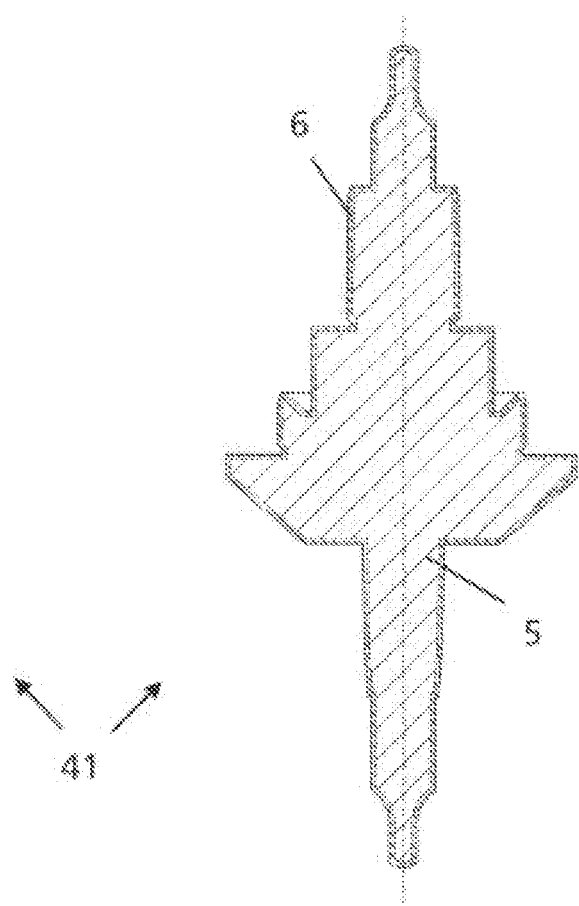
FIG. 7 shows a section through an exemplary embodiment of the balance wheel shaft.
Figure 8:
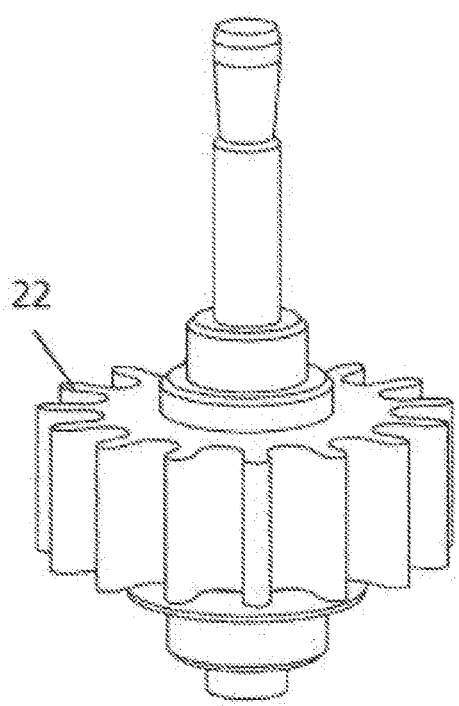
FIG. 8 shows a three-dimensional view of an exemplary embodiment of a pinion shaft.
Figure 9:
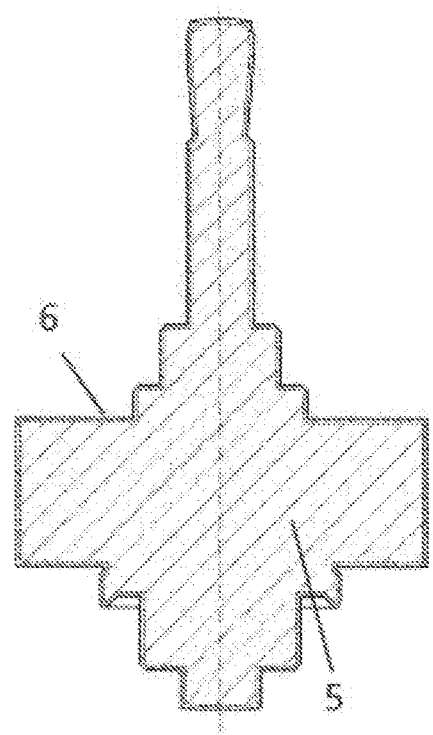
FIG. 9 shows a section through an exemplary embodiment of the pinion shaft.
Figure 10:
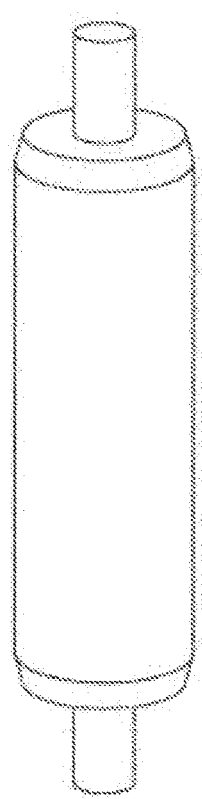
FIG. 10 shows a three-dimensional view of an exemplary embodiment of the escapement piece shaft.
Figure 11:
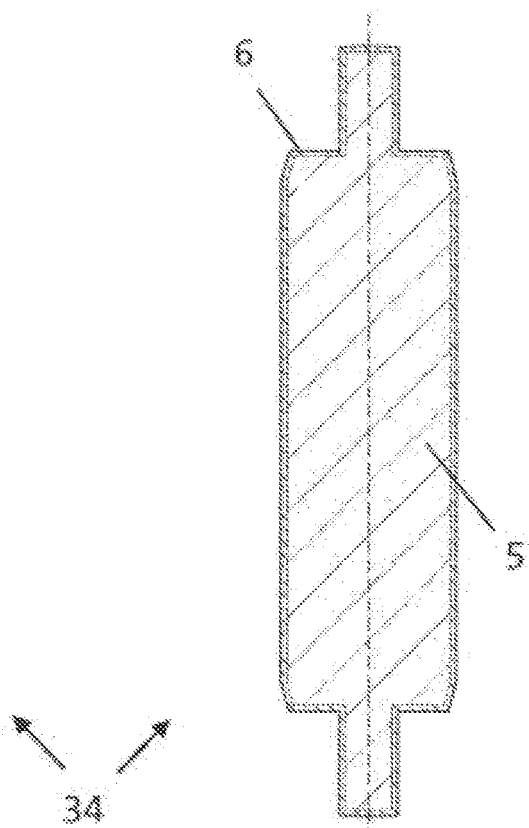
FIG. 11 shows a section through an exemplary embodiment of the escapement piece shaft.

The watch mechanism has a movement and optional additional mechanisms. FIG. 1 shows a section through an exemplary embodiment of a watch mechanism of said type, whereas FIGS. 2 and 3 show enlarged details from FIG. 1.

The movement has a drive mechanism 1, a gear mechanism 2, an escapement system 3 and an oscillation system 4.

The drive mechanism 1 stores the energy for the operation of the watch mechanism and is coupled to the gear mechanism 2 so as to output this energy to the gear mechanism 2. The drive mechanism 1 has, for this purpose, an energy store and a winding mechanism. The energy store is preferably a drive spring 11, preferably in the form of a spiral spring. The drive spring 11 is preferably produced from the amagnetic material Nivaflex (registered trademark). This spiral-shaped drive spring 11 is preferably arranged between a drive shaft 12 and a spring housing 13 which is rotatably mounted on the drive shaft 12. By means of the winding mechanism, the drive shaft 12 can be rotated and the drive spring 11 can be wound up. The winding mechanism preferably has a winding shaft and/or an automatic winding mechanism with an automatic gearing and a centrifugal mass. FIG. 1 and FIG. 3 show the toothed gear 14 of the winding mechanism, which rotates the drive shaft 12.

The gear mechanism 2 has a combination of shafts, pinions and toothed gears, which connects the drive mechanism 1, in particular a toothed ring on the circumferential side of the spring housing 13, with a particular transmission ratio to the escapement system 3. Each of the shafts that has at least one pinion is also referred to as pinion shaft. Preferably, the at least one pinion and the shaft of the pinion shaft are cut, preferably milled, from one material block, whereas the toothed gear is connected rotationally conjointly to the pinion shaft or to the shaft. An input pinion shaft 21 of the gear mechanism 2 is connected by means of its pinion 22 to the drive mechanism 1, whereas a toothed gear 27 of an output shaft 26 of the gear mechanism 2 engages into the escapement system 3. The gear mechanism 2 has for example three shafts 21, 24, 26 and three toothed gears 23, 25, 27 fastened to said shafts 21, 24, 26. However, more complex or simpler gear mechanisms with a greater or smaller number of shafts and gears are also possible.

The escapement system 3 is arranged between the gear mechanism 2 and the oscillation system 4 such that the gear mechanism 2, when any oscillation predefined by the oscillation system 4 is performed, is rotated onward by a predetermined angle of rotation. The escapement in system 3 preferably has an escapement wheel 31 and an escapement piece 32, for example an anchor. The escapement wheel 31 is fastened rotationally conjointly to an escapement wheel shaft 33 and is rotatable by means of the rotatably mounted escapement wheel shaft 33. A pinion of the escapement wheel shaft 33 is connected to the toothed gear 27 of the output shaft 26 of the gear mechanism 2. The escapement piece 32 is fastened rotationally conjointly to an escapement piece shaft 34 and is rotatable by means of the rotatably mounted escapement piece shaft 34. The escapement piece 32 impedes the rotation of the escapement wheel 31 caused by the drive spring 11 and releases the escapement wheel 31 once or twice per oscillation of the oscillation system 4 for the rotation of the escapement wheel 31 or of the gear mechanism 2 through the predetermined angle of rotation. On the escapement piece 32 there are preferably arranged, at the points of contact with the escapement wheel 31, pallets composed of gemstone, preferably composed of (synthetic) ruby. The pallets may however also be produced from a metal, for example from Phynox (described further below) or silicon. The pallets may also be produced as a unit with the escapement piece 32 from one block. Depending on the escapement mechanism, the escapement piece 32 may also be composed of multiple parts which are rotatable relative to one another, and/or the escapement wheel 31 may also be composed of multiple parts which are rotatable relative to one another.

The oscillation system 4 oscillates with a constant cycle time and releases the escapement system 3 or the escapement piece 32 once or twice per oscillation in order to thereby cause the predetermined rotation of the gear mechanism 2 or of the escapement wheel 31. The oscillation system 4 preferably has a rotatably mounted balance wheel shaft 41, a spiral spring (not illustrated) and a balance wheel mass (not illustrated). On the balance wheel shaft 41 there is generally formed a plateau with an ellipse. The balance wheel shaft 41 and the plateau, or the plateau and the ellipse, or all three, may be produced as a unit from one material block. It is however also possible for all three parts to be produced from three material blocks. In one exemplary embodiment, the plateau is produced from the hardened beryllium copper described further below, from silicon, from Declafor as described further below, from Phynox as described further below, or from Nivaflex. A plateau composed of Phynox or silicon could form the ellipse from the same material block. The ellipse is produced from a gemstone, preferably a (synthetic) ruby, silicon or Phynox as described further below. The balance wheel mass is produced for example from Declafor as described further below, from the hardened beryllium copper described further below, or from brass.

The described shafts (and the shafts which are not described) for the rotatable mounting of parts are preferably produced from a hardened copper alloy. The copper alloy is preferably a beryllium copper. The beryllium copper preferably has lead. The copper alloy is composed preferably of 1.8% to 2% beryllium (Be), 0.2% to 0.6% lead (Pb), of less than 1.1% other materials, and the remainder copper (Cu). The less than 1.1% other materials preferably have a total content of cobalt (Co) and nickel (Ni) of at least 0.2%, a total content of cobalt (Co) and nickel (Ni) and iron (Fe) of at most 0.6%, and at most 0.5% other materials (percentages relative to the total weight of the alloy). The percentages stated here and below for the material content of an alloy always refer to the percentages by weight unless stated otherwise. The desired shaft is cut, preferably turned and milled, from a material block composed of this copper alloy. To achieve a surface quality with a small roughness depth, a diamond is preferably used as a cutting tool. Owing to the hardness of the material of only approximately 380 HV (Vickers hardness), this material can be easily machined, which is important in particular for rotationally asymmetrical elements such as pinions formed on a pinion shaft. After the formation of the desired shaft, a polishing step, preferably a mechanical-chemical polishing step, is preferably performed. The shaft formed from the copper alloy is thereupon hardened by application of an amagnetic layer composed of a second material (or a material that differs from the beryllium copper). This second material is preferably an amorphous metal (also referred to as metallic glass). The applied coating is preferably thicker than 0.5 μm (micrometers), preferably thicker than 2.5 μm, preferably thicker than 5 μm, preferably thicker than 7 μm. The hardness-imparting layer composed of the second material is preferably applied at least in the region of the pins and/or, for a pinion shaft, in the region of the teeth of the pinion. In the simplest case, the entire shaft is enclosed by the coating composed of the second material. The shafts coated with the second material are preferably subjected to precipitation hardening (Durcissement structural) in order to thus make the parts or the coating harder still. This is generally performed by means of a heat treatment. Nickel is preferably used as an amagnetic layer. This layer may be applied for example by galvanization and/or chemical nickel plating. A nickel layer is known in the watch industry as a magnetic material and is not used as an amagnetic material. It is however possible for nickel to be produced and applied as an amagnetic layer. This may be achieved for example by means of an amorphous nickel layer. In addition or alternatively, the amagnetic layer may also be realized by means of a phosphorus content in the nickel layer, preferably by means of a phosphorus content of greater than 10%. In addition or alternatively, the amagnetic layer may also be realized by means of a chemical nickel plating process. By means of this nickel coating, a hardness of greater than 600 HV, preferably greater than 700 HV, preferably greater than 800 HV, can be realized. The formed shaft composed of the described copper alloy with the chemical nickel plating with a thickness of 3 μm is achieved a hardness of approximately 900 HV. A shaft produced in this way optimally combines the characteristics of the good forming of the shaft prior to the coating, the post-coating hardness of the shaft required for the accurate operation of the watch mechanism with little wear, and the amagnetic characteristics of the shaft.

Examples of the drive shaft 12 (FIGS. 4 and 5), of the balance wheel shaft 41 (FIGS. 6 and 7), of the central pinion shaft 21 (FIGS. 8 and 9) and of the escapement piece shaft 34 (FIGS. 10 and 11) composed of the beryllium copper that is coated for hardening purposes are shown in FIGS. 4 to 11. Here, the core 5 of the respective shaft in the respective form is produced from one material block composed of beryllium copper. Said core 5 is thereupon coated with an amagnetic coating 6, preferably nickel.

In another exemplary embodiment, at least one of the described shafts (and of the shafts which are not described) is produced from an amagnetic material other than copper beryllium, and is coated with the described hardness-imparting amagnetic nickel coating.

Some or all of the shafts are preferably mounted on gemstones, preferably (synthetic) rubies. The shafts are preferably mounted rotatably between a circuit board and a bridge. The circuit board and the bridge are produced preferably from brass, preferably from CuZn38Pb2. The brass is either hardened by means of a coating, in particular a nickel coating, as described above for the shafts, or is protected by means of a gold plating.

It is preferable for at least one shaft, in particular the winding shaft, and/or the crown to be produced preferably from an amagnetic high-grade steel. Such high-grade steels are very rare and are very difficult to machine, and are therefore hitherto unknown in the watch industry. Such high-grade steels are used for example in the field of medical technology. An amagnetic high-grade steel of said type preferably has a chromium (Cr) fraction of greater than 10%, preferably greater than 15%. One example is the high-grade steel X2CrNiMo 18-15-3 (DIN short designation) composed of a maximum of 0.03% carbon (C), a maximum of 0.75% silicon (Si), a maximum of 2% manganese (Mn), a maximum of 0.025% phosphorus (P), a maximum of 0.003% sulfur (S), between 17% and 19% chromium (Cr), between 2.7 and 3% molybdenum (Mo), between 13% and 15% nickel (Ni), a maximum of 0.5% copper (Cu), a maximum of 0.1% nitrogen, and the remainder iron (Fe). An alternative example for an amagnetic high-grade steel of said type with chromium is the high-grade steel known under the trademark name Biodur 108 (UNS S 29108) composed of a maximum of 0.08% carbon (C), a maximum of 0.75% silicon (Si), between 21% and 24% manganese (Mn), a maximum of 0.03% phosphorus (P), a maximum of 0.01% sulfur (S), between 19% and 23% chromium (Cr), between 0.5 and 1.5% molybdenum (Mo), a maximum of 0.1% nickel (Ni), a maximum of 0.25% copper (Cu), a maximum of 0.9% nitrogen (N), and the remainder iron (Fe).

The escapement piece, the escapement wheel and the springs used in the watch mechanism are (unless explicitly described otherwise) produced from an alloy which, as main constituents, has iron, nickel, chromium and cobalt (preferably also molybdenum and manganese). The alloy is preferably composed of the following elements: between 39 and 41 percent cobalt (Co), between 19 and 21 percent chromium (Cr), between 15 and 18 percent nickel (Ni), between 6.5 and 7.5 percent molybdenum (Mo), between 1.5 and 2.5 percent manganese (Mn), less than 3 percent other materials, and a residual content of iron. The less than 3% other materials preferably comprise less than 0.15% carbon (C), less than 1.2% silicon (Si), less than 0.001 beryllium (Be), less than 0.015% phosphorus (P), less than 0.015 sulfur (S) (percentages relative to the total weight of the alloy). This material is also named Phynox (registered trademark). The parts formed from this material are preferably subjected, before, during and/or after the forming process, to a precipitation hardening (Durcissement structural) process in order to thereby make the parts harder. In this way, despite the use of amagnetic materials, it is possible to realize hardnesses of greater than 500 HV, in particular approximately 600 HV. Preferably, the parts are subjected to coarse formation, for example by means of a CNC miller, before the hardening process, and subjected to fine forming after the hardening process. The formed and hardened parts are thereafter preferably subjected also to a mechanical chemical polishing process.

The escapement piece and the escapement wheel may alternatively also be produced from silicon.

The screws, which are normally produced from steel, also cannot be used in an amagnetic watch. Therefore, the screws are produced from a titanium alloy. In one exemplary embodiment, use is made of the so-called titanium grade 5 alloy (3.7165/DIN TiAl6V4) which, in addition to titanium, is composed of between 5.5% and 6.75% aluminum (Al), between 3.5% and 4.5% vanadium and less than 2% other materials. The less than 2% other materials preferably comprise less than 0.3% iron (Fe), less than 0.2% oxygen (O), less than 0.05% nitrogen (N), less than 0.08% carbon (C), less than 0.015% hydrogen (H) (percentages relative to the total weight of the alloy). Preferably, the parts formed from this material are subjected, before, during and/or after the forming, to a precipitation hardening process in order to thereby make the parts harder. In this way, despite the use of amagnetic materials, it is possible to realize hardnesses of greater than 250 HV, in particular approximately 350 HV. The formed and hardened parts are thereafter preferably subjected also to a mechanical chemical polishing process.

The spring housing and the toothed gears of the gear mechanism are preferably produced from Declafor (registered trademark), that is to say from a copper alloy with nickel and tin, more specifically a copper alloy composed of 7.5% nickel (Ni), 5% tin (Sn), less than 1.85% other materials, and the remainder copper (Cu). The less than 1.85% other materials have for example between 0.05% and 0.3% manganese (Mn), a maximum of 0.5% zinc (Zn), a maximum of 0.5% iron (Fe), a maximum of 0.03% lead (Pb), a maximum of 0.02% phosphorus (P), and a maximum of 0.5% other materials. Preferably, the parts formed from this material are subjected, before, during and/or after the forming, to a precipitation hardening process in order to thereby make the parts harder. In this way, despite the use of amagnetic materials, it is possible to realize hardnesses of greater than 250 HV, in particular approximately 320 HV. The formed and hardened parts are thereafter preferably subjected also to a mechanical chemical polishing process and/or a gold plating process.

The described watch mechanism is preferably installed in a watch, in particular in a wristwatch or pocket watch. If the housing and/or the wristband are produced from a metallic material, then a titanium alloy, such as for example that described above, is preferably used for this purpose.

With the materials described here, it has been possible to construct a wristwatch which satisfies the STANAG 2897 standard and at the same time satisfies the NIHS 91-10 standard for shock resistance. It has furthermore been demonstrated that a watch of said type, even after 10 minutes in a magnetic field of 100,000 gauss, still exhibits an accuracy, demanded by the NIHS 90-10 standard, of less than 30 seconds per day.

An exemplary embodiment of a watch has been described. However, the invention can be transferred analogously to any other measurement instrument with mechanical functional parts such as a gear mechanism, a gearing, pointers, shafts or pinion shafts. Examples of such measurement instruments are depth meters, pressure meters, speed meters or altitude meters.

The invention claimed is:

1. A mechanical watch mechanism comprising metallic parts, wherein each part of the mechanical watch mechanism has a relative magnetic permeability of less than 1.01, wherein one of the parts is a shaft composed of metal, wherein the shaft is coated with an amagnetic coating, wherein the coating is a nickel layer and wherein the nickel layer is a chemical nickel layer with a hardness of greater than 600 HV, wherein the at least one shaft is produced from a beryllium copper and is hardened with a coating which is applied to the beryllium copper and which increases the hardness of the beryllium copper, and wherein the shaft is a balance wheel shaft for the rotatable mounting of the balance wheel, an escapement piece shaft for the rotatable mounting of the escapement piece, a drive shaft for the rotatable mounting of the drive mechanism, or a winding shaft for the rotatable mounting of the winding mechanism.

2. The mechanical watch mechanism as claimed in claim 1, wherein the beryllium copper of the shaft has at least 0.2% lead.

3. The mechanical watch mechanism as claimed in claim 1, wherein the nickel layer has a phosphorus fraction of greater than 10%.

4. The mechanical watch mechanism as claimed in claim 1, wherein the nickel coating is an amorphous metal.

5. The mechanical watch mechanism as claimed in claim 1, wherein the shaft is a pinion shaft, wherein the pinion shaft has a pinion and a shaft, wherein the pinion and the shaft of the pinion shaft form a unit produced from one material block.

6. The mechanical watch mechanism as claimed in claim 1, wherein at least one of the parts is a spring, an escapement wheel, an escapement piece, a bridge, a stud, or a tourbillon and is produced from an alloy which, as main constituents, has cobalt, chromium, iron and nickel.

7. The mechanical watch mechanism as claimed in claim 6, wherein the alloy is composed of the following elements:
between 39 and 41 percent cobalt,
between 19 and 21 percent chromium,
between 15 and 18 percent nickel,
between 6.5 and 7.5 percent molybdenum,
between 1.5 and 2.5 percent manganese,
less than 3 percent other materials and
a residual content of iron.

8. The mechanical watch mechanism as claimed in claim 1, wherein at least one part of the watch mechanism is a multiplicity of screws composed of a titanium alloy.

9. The mechanical watch mechanism as claimed in claim 1, wherein at least one part of the watch mechanism is a spiral spring of a balance wheel, an escapement wheel, or an escapement piece and is produced from silicon.

10. The mechanical watch mechanism as claimed in claim 1, wherein at least one part of the watch mechanism is composed of an amagnetic high-grade steel which has more than 10% chromium.

11. The mechanical watch mechanism as claimed in claim 10, wherein the at least one part composed of the amagnetic high-grade steel is a shaft and/or a crown.

12. The mechanical watch mechanism as claimed in claim 1, wherein the watch mechanism satisfies the NIHS 91-10 standard.

13. The mechanical watch mechanism as claimed in claim 1, wherein the coating has a thickness of 3 μm and a hardness of 900 HV.

14. The mechanical watch mechanism as claimed in claim 1, wherein
the beryllium copper shaft is composed of the following elements:
1.8 to 2 percent beryllium,
0.2 to 0.6 percent lead,
less than 1.1 percent other materials, and
a reminder of copper.

15. A method for producing a mechanical watch mechanism, having:
producing the individual parts of the mechanical watch mechanism, wherein the individual parts are at least partially composed of metal and each individual part has a relative magnetic permeability of less than 1.01 wherein one of the parts is a shaft composed of metal, wherein the shaft is coated with an amagnetic coating, wherein the coating is a nickel layer and wherein the nickel layer is a chemical nickel layer with a hardness of greater than 600 HV, wherein the at least one shaft is produced from a beryllium copper and is hardened with a coating which is applied to the beryllium copper and which increases the hardness of the beryllium copper, and wherein the shaft is a balance wheel shaft for the rotatable mounting of the balance wheel, an escapement piece shaft for the rotatable mounting of the escapement piece, a drive shaft for the rotatable mounting of the drive mechanism, or a winding shaft for the rotatable mounting of the winding mechanism; and
assembling the individual parts to form a mechanical watch mechanism.

16. A pinion shaft comprised of metal for a mechanical watch mechanism or measurement instrument, having a relative magnetic permeability of less than 1.01, wherein the shaft is coated with an amagnetic coating, wherein the coating is a nickel layer and wherein the nickel layer is a chemical nickel layer with a hardness of greater than 600 HV, wherein the shaft is produced from a beryllium copper and is hardened with a coating which is applied to the beryllium copper and which increases the hardness of the beryllium copper, and wherein the shaft is a balance wheel shaft for the rotatable mounting of the balance wheel, an escapement piece shaft for the rotatable mounting of the escapement piece, a drive shaft for the rotatable mounting of the drive mechanism, or a winding shaft for the rotatable mounting of the winding mechanism.

17. The pinion shaft as claimed in claim 16, wherein the beryllium copper has at least 0.2% lead.

18. The pinion shaft as claimed in claim 16, wherein the nickel layer has a phosphorus fraction of greater than 10%.

* * * * *